UNITED STATES PATENT OFFICE.

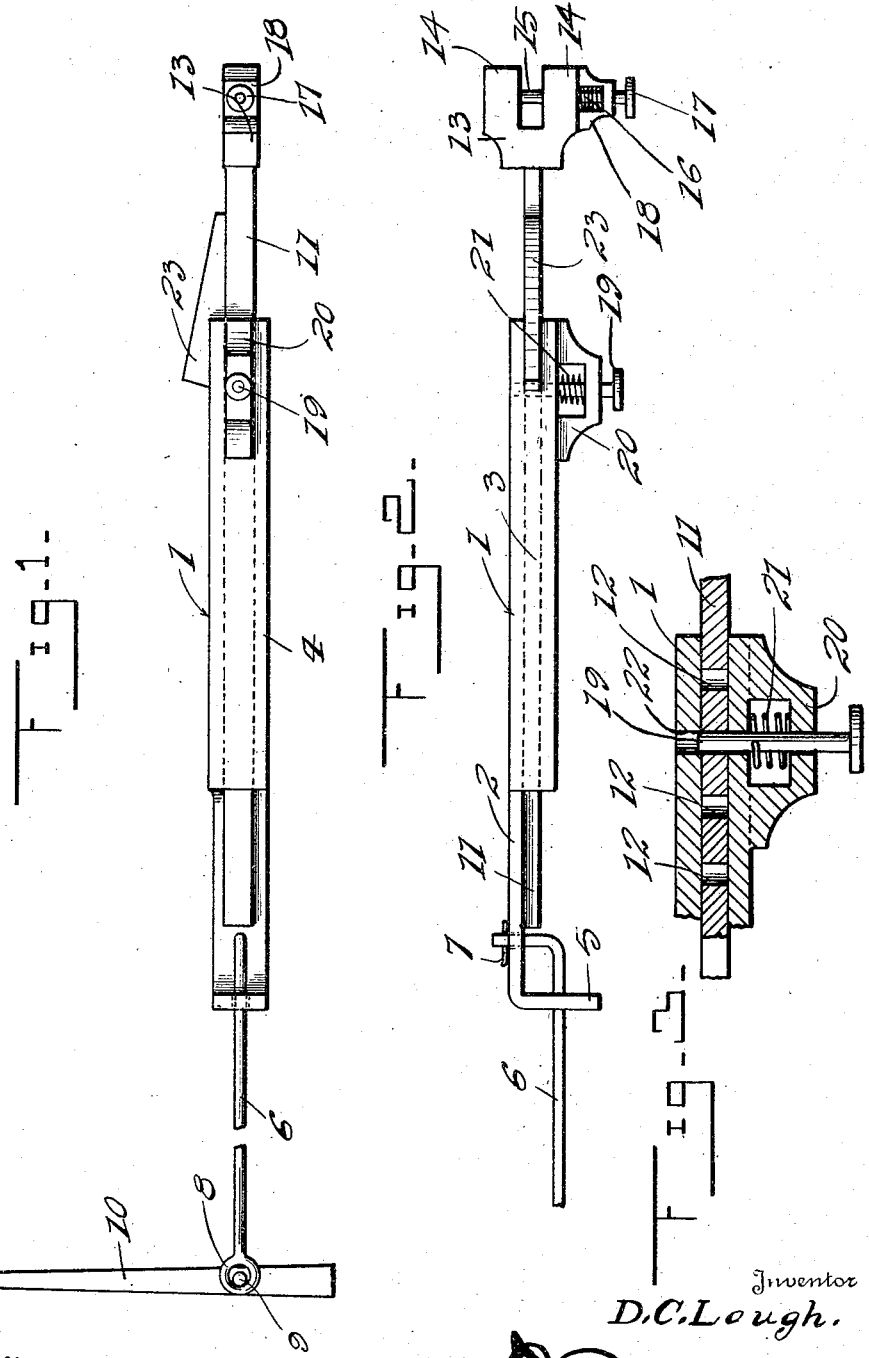

DAVID C. LOUGH, OF GREENLAND, WEST VIRGINIA, ASSIGNOR OF ONE-HALF TO CLARENCE E. REED, OF GREENLAND, WEST VIRGINIA.

ADJUSTABLE BRAKE-ROD.

1,156,789.  Specification of Letters Patent.  Patented Oct. 12, 1915.

Application filed March 20, 1915. Serial No. 15,817.

*To all whom it may concern:*

Be it known that I, DAVID C. LOUGH, a citizen of the United States, residing at Greenland, in the county of Grant and State of West Virginia, have invented certain new and useful Improvements in Adjustable Brake-Rods; and I do hereby declare the following to be a full, clear, and exact description of the invention, such as will enable others skilled in the art to which it appertains to make and use the same.

This invention relates to adjustable brake rods for vehicles, and one of the principal objects of the invention is to provide a brake rod which can be readily adjustable without removing the ordinary pins or bolts for holding two adjusted portions together, thus avoiding the loss of bolts and pins, and at the same time providing an improved structure which can be quickly adjusted to the desired length.

The foregoing and other objects may be attained by means of the construction illustrated in the accompanying drawing, in which—

Figure 1 is a plan view of an adjustable brake rod for vehicles made in accordance with this invention, Fig. 2 is a side elevation of the same, and Fig. 3 is a detail sectional view showing the manner of adjusting the two members of the brake rod.

Referring to the drawing, the numeral 1 designates a guide consisting of a flat bar 2 and side and top members 3 and 4. The bottom bar 2 of the guide is bent at right angles as at 5, and connected to the bar and to the angularly bent end 5 is a rod 6, said rod extending through the bent end 5 and through the body 2 of the bar and secured thereto by a pin, preferably a cotter pin 7. The rod 6 is provided with a ring 8 which engages a pin 9 on the hand lever 10.

Fitted to slide in the guide 1 is a brake rod 11 provided with perforations 12. Secured to the outer end of the brake rod 11 is a clevis 13 comprising spaced members 14 and a pin 15 extending through said members and provided with a spring 16 which holds the pin connected to the members 14, said pin being provided with a head 17 and said clevis being provided with a keeper 18 for the said spring. The pin 15 is adapted to be connected to a brake beam.

A pin 19 extends through a keeper 20 and is provided with an encircling spring 21 for holding said pin in any one of the perforations 12 and in a single alining perforation 22 in the bar 2 of the guide. The spring 16 is connected to the pin 15, and the spring 21 is connected to the pin 19. A guide member 23 is connected to the side of the guide and serves to hold the brake rod 11 in alinement with the entrance to the guide.

From the foregoing it will be obvious that the brake rod 11 may be adjusted relatively to the guide 1 by pulling out the pin 19 until the desired perforation is in alinement with the perforation in the guide and then permitting the pin to move back into the perforations. In this manner the length of the brake rod as a whole may be easily adjusted. When it is desired to connect the brake rod to the brake beam, the pin 15 is pulled out against the tension of the spring 16.

From the foregoing it will be obvious that the pins 15 and 19 are always in position for use and cannot be lost or misplaced.

Various changes may be made in the details of construction without departing from the spirit and scope of the invention as defined in the claims.

What is claimed is:—

1. An adjustable brake rod comprising a guide, a rod connected to the guide, a lever connected to the rod, an adjustable bar mounted in said guide, and a spring actuated pin for holding said bar in adjusted position, a clevis connected to the end of the bar and a spring actuated pin for engaging a brake beam.

2. An adjustable brake rod comprising a guide casing, a rod connected to said casing and a lever connected to said rod, a brake rod or bar mounted in said guide and provided with a series of perforations, a pin connected to the guide and extending through the same, a keeper connected to the guide, a spring connected to said pin and mounted in said keeper, and a clevis having a spring actuated pin connected to said bar.

In testimony whereof I affix my signature in presence of two witnesses.

DAVID C. LOUGH.

Witnesses:
 JAMES H. MORELAND,
 FRANK M. HAWK.

Copies of this patent may be obtained for five cents each, by addressing the "Commissioner of Patents, Washington, D. C."